(12) United States Patent
Gallego Castro et al.

(10) Patent No.: US 11,590,743 B2
(45) Date of Patent: Feb. 28, 2023

(54) ACTIVE POLYSTYRENE FILM

(71) Applicant: VISCOFAN, S.A., Tajonar (ES)

(72) Inventors: Raúl Gallego Castro, Valladolid (ES); Llucià Cordero Cerrada, Girona (ES)

(73) Assignee: VISCOFAN, S.A., Tajonar (ES)

( * ) Notice: Subject to any disclaimer, the term of this patent is extended or adjusted under 35 U.S.C. 154(b) by 77 days.

(21) Appl. No.: 16/759,395

(22) PCT Filed: Oct. 24, 2018

(86) PCT No.: PCT/ES2018/070691
§ 371 (c)(1),
(2) Date: Apr. 27, 2020

(87) PCT Pub. No.: WO2019/086734
PCT Pub. Date: May 9, 2019

(65) Prior Publication Data
US 2020/0269557 A1    Aug. 27, 2020

(30) Foreign Application Priority Data
Oct. 27, 2017   (ES) .................... P201731261

(51) Int. Cl.
*B32B 27/30* (2006.01)
*B32B 27/08* (2006.01)
(Continued)

(52) U.S. Cl.
CPC ............ *B32B 27/302* (2013.01); *B32B 27/08* (2013.01); *B32B 27/18* (2013.01); *B65D 65/40* (2013.01); *B65D 81/28* (2013.01); *C08J 5/18* (2013.01); *C08L 25/06* (2013.01); *B32B 2250/246* (2013.01); *B32B 2250/40* (2013.01); *B32B 2270/00* (2013.01); *B32B 2439/70* (2013.01);
(Continued)

(58) Field of Classification Search
None
See application file for complete search history.

(56) References Cited

U.S. PATENT DOCUMENTS 3,313,868 A * 4/1967 Freda ................. C08L 23/16
   525/227
8,343,522 B2  1/2013 Pohl et al.
(Continued)

FOREIGN PATENT DOCUMENTS

CN    103205080    *  7/2013  ............ C08K 13/04
CN    107200948 A    9/2017
(Continued)

OTHER PUBLICATIONS

Bhunia—Comp Rev Food Sci Food Safe—Migration of Chemicals Packaging Polymers—Microwave—2013 (Year: 2013).*
(Continued)

*Primary Examiner* — Callie E Shosho
*Assistant Examiner* — John Vincent Lawler
(74) *Attorney, Agent, or Firm* — Marshall, Gerstein & Borun LLP

(57) ABSTRACT

The present invention belongs to the field of active polymer materials. Specifically, it relates to an active polystyrene film that has antimicrobial or antioxidant activity and the method of production of said film. It also refers to wrappers, packages and slice separators (interleavers) that comprise said film.

25 Claims, 10 Drawing Sheets

(51) Int. Cl.
 B32B 27/18 (2006.01)
 B65D 65/40 (2006.01)
 B65D 81/28 (2006.01)
 C08J 5/18 (2006.01)
 C08L 25/06 (2006.01)

(52) U.S. Cl.
 CPC ........ C08J 2325/06 (2013.01); C08J 2423/08 (2013.01); C08J 2425/06 (2013.01); C08L 2205/025 (2013.01); C08L 2205/035 (2013.01)

(56) References Cited

U.S. PATENT DOCUMENTS

| | | | | |
|---|---|---|---|---|
| 8,734,879 | B2 | 5/2014 | Sawyer et al. | |
| 2005/0048285 | A1* | 3/2005 | Ebner | C08K 5/098 428/34.1 |
| 2007/0066726 | A1* | 3/2007 | Sharma | B32B 27/08 524/115 |
| 2010/0034928 | A1* | 2/2010 | Paleari | C09D 127/08 426/87 |
| 2012/0141642 | A1* | 6/2012 | Kubik | B32B 7/12 426/133 |
| 2012/0276357 | A1* | 11/2012 | Soto-Valdez | C08K 5/1545 428/220 |

FOREIGN PATENT DOCUMENTS

| | | | | |
|---|---|---|---|---|
| MX | 2014001285 | A | 6/2015 | |
| MX | 20140066726 | * | 6/2015 | ............ B65D 35/08 |
| WO | WO-2009/024846 | A1 | 2/2009 | |
| WO | WO-2017/049364 | A1 | 3/2017 | |
| WO | WO-2017/109741 | A1 | 6/2017 | |

OTHER PUBLICATIONS

Ye—CN 103205080 A—Euro. D1—MT—antibacterial polystyrene—2013 (Year: 2013).*
Greth—HLB system for emulsifier—J of Applied Polymer Sci—Apr. 1961 (Year: 1961).*
Moreira—Cocontinuous morphologies in polystyrene ethylene vinyl acetate blends—J.Appl.Poly.Sci.—2003 (Year: 2003).*
Hamberger-Stenhagen2003_Erucamide As A Modulator—Neruochemical Res.—2003 (Year: 2003).*
Verdugo—MX2014-001285 A—ISR D3—Google Trans.—Compatibilized plastic w—anitmicrobial & antioxidant activity—2015 (Year: 2015).*
Soares—Effect of double percolation on electrical properties . . . CB loaded PS-EVA copolymer blends—J.Appl.Poly.Sci.—2016 (Year: 2016).*
PolymerDatabase—Polystyrene—density—May 4, 2022 (Year: 2022).*
Chemical Book—Ethylene—vinyl acetate copolymer CAS#_24937-78-8—May 4, 2022 (Year: 2022).*
Millipore-Sigma—Polyoxyethylene (20) sorbitan monolaurate—May 5, 2022 (Year: 2022).*
Buege et al., "Microsomal Lipid Peroxidation", Methods in Enzymology, 52, 1978, pp. 302-310.
Search Report in International Application No. PCT/ES2018/070691 dated Mar. 21, 2019, 6 pages.

* cited by examiner

ACTIVE POLYSTYRENE FILM

FIELD OF THE INVENTION

The present invention relates to the field of polymeric materials that release active substances for protection and/or extension of the shelf life of food. Specifically, it relates to an active polystyrene film that has antimicrobial or antioxidant activity and the method of preparing said film. It also relates to wrappers, packages and slices separating films (interleavers) comprising said film.

BACKGROUND OF THE INVENTION

In order to improve the oxidative and microbial stability of food products and thus prolonging their shelf life, antioxidant and antimicrobial agents, respectively, are used as additives that are added directly to the products.

Thus, it is common practice that antioxidant agents or antimicrobial agents are directly added, in relatively high amounts, during the processing or before the packaging of food products, in order to protect them for a long time. During storage and marketing, that initial amount gradually decreases as it exerts its antioxidant or antimicrobial effect and eventually runs out. This is the moment when oxidation reactions start and the product begins to deteriorate, or when the microorganisms present in the product begin to grow.

Oxidation reactions in packaged food products start on the surface, particularly in the portion that first receives oxygen or light that diffuses through the wall of the packages, so systems have been developed where the package is used as a vehicle for the application of antioxidant agents.

Likewise, the part of a packaged food that is most vulnerable to microbial contamination is its surface and different systems have been described where the package is used as a vehicle for the application of antimicrobial agents.

Producers of films and packaging for food products have spent decades trying to develop films and packaging with antioxidant or antimicrobial properties. Various products have been described in the literature.

U.S. Pat. No. 8,343,522 B2 describes coated sheets for antimicrobial treatment based on biopolymers, particularly cellulosic and proteinic (e.g. collagen). The sheet is antimicrobial in nature because it is impregnated or coated with at least one α-amino acid ester, where said α-amino acid is covalently linked to the film. Due to said covalent link, the antimicrobial agent is not capable of being released into the medium.

WO 2017/049364 A1 describes a food packaging material comprising a polymeric material and an antioxidant agent. In particular, in the tests shown the polymeric material is polyethylene resin and the antioxidant is a rosemary extract.

US 2012/0276357 A1 describes a packaging material with antioxidant activity comprising at least 89% of a polymeric substance, between 2-10% of tocopherol and between 0.1-1% of a surface modifying agent. In particular, in the tests shown the polymeric substance is low-density polyethylene.

U.S. Pat. No. 8,734,879 discloses a method of preserving a food product through a packaging material having preservative properties. Said packaging material comprises a $N^\alpha$-lauroyl-L-arginine ethyl ester salt and an acyl monoglyceride comprising glycerol monolaurate incorporated in a polymeric material. Said document shows a synergistic effect on the preservative action only between $N^\alpha$-lauroyl-L-arginine ethyl ester salt and glycerol monolaurate, there are no tests with other compounds.

To date, the inventors are not aware of the presence of these products on the market. In particular, they have not found any slice polystyrene separators having antioxidant or antimicrobial properties.

Surprisingly, the authors of the present invention have developed a film in which the active substances migrate towards the surface of the film and maintain their functionality despite the film manufacturing process. With this film you can prepare slice separators, wraps and packages for food products with antioxidant or antimicrobial properties. Thus, these separators, wraps and packages provide antioxidant or antimicrobial properties to food products with which they are in contact. This supposes important advantages, between which it is possible to emphasize the prolongation of the useful life of these products.

Object of the Invention

The present invention relates in a first aspect to a polystyrene film for applications in contact with food products characterized in that it comprises at least one layer comprising:
- 60%-75% ($w/w_t$) crystal polystyrene (hereinafter referred to as PS);
- 10%-35% ($w/w_t$) ethylene copolymer with polar monomers (hereinafter referred to as EMP) with a comonomer content of 15-40% by weight with respect to the total weight of the EMP ($w/w_{EMP}$);
- an active substance selected from the group consisting of antioxidant agent and antimicrobial agent;
- 0.5%-2% ($w/w_t$) of migration agent (hereinafter referred to as MA);
- 0%-15% ($w/w_t$) of emulsifying agent (hereinafter referred to as EA) with an HLB greater than 8, being 3-15% ($w/w_t$) when the active substance is an antimicrobial agent; and where the PS/(EMP+EA) ratio is between 1.2 and 7.5.

A second aspect of the present invention relates to a slice separating film (interleaver) comprising a film according to the first aspect of the invention.

A third aspect of the present invention relates to a food packaging or wrapping that is made from or comprises a film according to the first aspect of the invention.

A fourth aspect of the present invention relates to the use of a film according to the first aspect of the invention for food packaging or as a food separating film.

A fifth aspect of the present invention relates to the method of producing a film according to the first aspect of the invention.

Other objects, features, advantages and aspects of the present application will be apparent to the person skilled in the art from the description and the attached claims.

DETAILED DESCRIPTION OF THE INVENTION

Figure 1A:
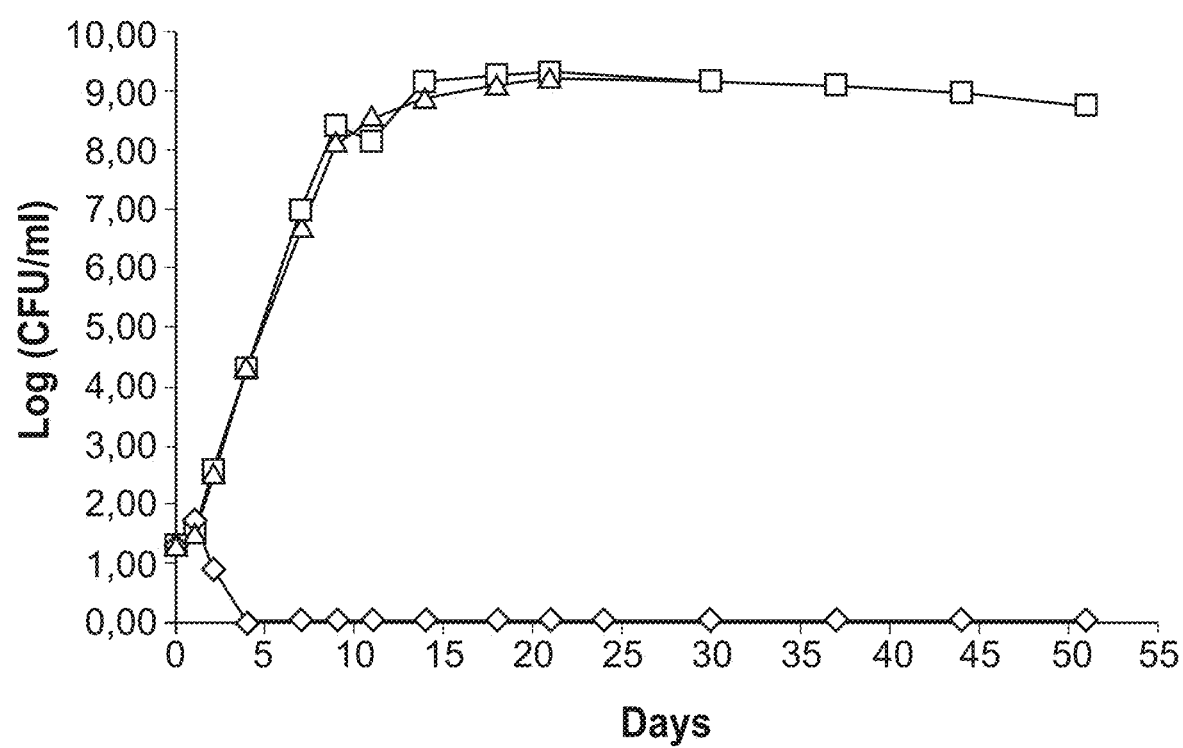
FIG. 1: Graphical representation of bacterial growth (in log CFU/ml) as a function of time (in days), where the red square is the control, the blue triangle is the film without EMP, and the green diamond is the film with EMP. In panel A the initial concentration of *Listeria* was $10^1$ and in panel B $10^5$.

As used in the present application, the singular forms "a/an", "one" and "the" include their corresponding plurals unless the context clearly indicates otherwise. Unless otherwise defined, all the technical terms used herein have the meaning that one of ordinary skill in the art to which this invention pertains usually understands.

In order to facilitate understanding and clarify the meaning of certain terms in the context of the present invention, the following definitions and particular and preferred embodiments thereof are herein provided, which are applicable to all embodiments of the different aspects of the present invention:

"Crystal Polystyrene" (PS) (also known as Amorphous Polystyrene or General Purpose Polystyrene (GPPS, acronym for General Purpose Polystyrene), is a polymer whose average molecular weight is between 100,000 g/mol and 400,000 g/mol. It is transparent, hard, brittle and vitreous below 100° C. Above this temperature it is easily processable and can be given multiple shapes. It is completely atactic, that is, the phenyl groups are distributed on one side or the other of the central chain, in no particular order and therefore it is a completely amorphous polymer.

"Modified Resistant Polystyrene" (HIPS, acronym for High Impact Polystyrene), also referred to as high impact polystyrene or medium impact polystyrene, is a graft copolymer as it contains a styrene backbone and grafted polybutadiene chains. This copolymer is wear resistant and has a high impact resistance.

"Emulsifying agent" (EA) refers to any emulsifier that has an HLB greater than 8, is processable at a temperature of up to 200° C. and its use is permitted when it is contact with food and/or is edible. EA facilitates the solubility of the active substance and its release in the medium. In a particular embodiment, the EA is selected from the group consisting of polyethylene glycol 400 dioleate (PEG400DO), polyoxyethylene (20) sorbitan monolaurate (Tween® 20), polyoxyethylene (20) sorbitan monopalmitate (Tween® 40), polyoxyethylene (20) sorbita monostearate n, (Tween® 60), polyoxyethylene (20) sorbitan triestearate (Tween® 65), polyoxyethylene (20) sorbitan monooleate (Tween® 80), ethylene polyoxide 40 stearate (PEO40-S), sorbitan monolaurate (Span® 20) and mixtures thereof. In a preferred embodiment, the EA is selected from the group consisting of PEG400DO, Tween® 80, PEO40-S and mixtures thereof, and more preferably the EA is Tween® 80.

"Migration agent" (hereinafter referred to as MA) refers to a molecule that contains a hydrophobic and a hydrophilic portion, which makes it incompatible with the polymeric matrix and causes its diffusion through it, accumulating on the surface with its hydrophilic part towards the outside and its hydrophobic part towards the polymer. Due to the tendency of this molecule to orient itself, diffuse and accumulate on the surface, it causes entrainment of the active substance, which is attracted by the hydrophobic chain. In a particular embodiment, the MA is selected from the group consisting of fatty acid amides (e.g. erucamide and oleamide), fatty acid esters (e.g. glycerol monostearate (MG)), metal stearates (e.g. zinc stearate), waxes and mixtures thereof. In a particular embodiment, the fatty acid esters do not include glycerol monolaurate. Preferably, the MA is selected from the group consisting of erucamide, oleamide, MG, zinc stearate, waxes, and mixtures thereof, and more preferably the MA is MG or erucamide.

The "antioxidant agent" (hereinafter referred to as the AO agent) is an agent with antioxidant properties that, among others, prevents fats rancidity and/or food browning, particularly meat. In a particular embodiment the AO agent is selected from the group consisting of tocopherol, green tea extract, olive leaf extract, rosemary extract, grape seed extract, coffee extract, dehydrated acerola (e.g. dehydrated acerola powder with 17%-25% vitamin C), citrus extracts with a flavonoid concentration greater than 45%, tomato extract with a lycopene concentration greater than 5% (e.g. LYCOSEEN®), fruit extract (e.g. Polyfence® 2), thymol and mixtures thereof. Preferably, the AO agent is selected from tocopherol, tea extract, and mixtures thereof, and more preferably is tocopherol. The tocopherol can be α, β, γ or mixtures thereof (e.g. CAS 59-02-9, 16698-35-4, 54-28-4, 119-13-1), preferably being a mixture of α-tocopherol, β-tocopherol and γ-tocopherol.

The "antimicrobial agent" (hereinafter referred to as AM agent) is an active agent against bacteria (gram + and/or gram −), fungi or yeast. Thus, it can be an antibacterial, antifungal or anti-yeast agent. It can also be an agent that is active against several of said microorganisms. In a preferred embodiment AM is an antibacterial and/or antifungal agent.

The "antibacterial agent" (hereinafter referred to as AB) is an agent that is capable of preventing bacterial growth (bacteriostatic effect) or is capable of killing bacteria (bactericidal effect). In the present invention it is considered that there is a "bacteriostatic effect" when there is a difference in bacterial growth with and without AB agent of at least two logarithmic units. In a particular embodiment, AB agent is selected from the group consisting of anhydrous sodium acetate, nisin, lysozyme, Ag and its salts, Zn and its salts, ethyl N$^\alpha$-dodecanoyl-L-arginate (hereinafter referred to as LAE), LAE salts, and glycolipid biosurfactants. Among the LAE salts is LAE hydrochloride (hereinafter referred to as LAE-Cl). Among the glycolipid biosurfactants are rhamnolipids, soporolipids, xylolipids, and mannoseitrite lipids. Preferably, AB agent is selected from LAE, salts thereof, preferably LAE-Cl, and mixtures thereof, and more preferably AB agent is LAE or LAE-Cl (e.g. CAS 60372-77-2).

The "antifungal agent" (hereinafter referred to as AF agent) is an agent with fungicidal (which kills mold) and/or fungistatic properties (which prevents mold growth). In a particular embodiment, AF agent is selected from the group consisting of mixtures of medium-chain mono-, di-, and triglycerides, monolaurin, nisin, lysozyme, biosurfactant glycolipids, LAE and its salts, in particular LAE-Cl, and mixtures thereof. More particularly, AF agent is selected from the group consisting of mixtures of medium-chain mono-, di-, and triglycerides, nisin, lysozyme, glycolipid biosurfactants, LAE and its salts, particularly LAE-Cl, and mixtures thereof. In the present invention, "medium-chain glycerides" are understood to be those of $C_8$-$C_{12}$ chain, preferably $C_8$-$C_{10}$. In a preferred embodiment, the AF agent is LAE, LAE-Cl, $C_8$-$C_{10}$ mono-, di- and triglycerides (e.g. CAS 91744-32-0).

Food legislation applicable to each country restricts the number of substances that may be in contact with food and its boundaries. The substances must be suitable for food contact, not only in their original form, but also after changes in pH, exposure to heat, humidity, etc., or hydrolytic breakdown. Thus, in the present invention, all the components of the film of the invention must be suitable for contacting food and for consumption, since the film of the invention is for those applications in which there is contact between the film and a food product.

The objective of the polystyrene film of the invention is to provide antioxidant or antimicrobial protection to the food product with which it is in contact, in order to improve the appearance of the product, prolong the useful life of the product, etc. In order for the minimum amount of active substance to be released so that the film has functionality, it is necessary to replace part of the polystyrene with a polymer compatible with it, with adequate polarity and viscosity. In this case, said compatible polymer is EMP with a given comonomer content. The film of the invention comprises a polymeric matrix (hereinafter also called plastic resin or resin) comprising PS and EMP. Thus, the present invention relates in a first aspect to a polystyrene film for applications in contact with food products (hereinafter referred to as the film of the invention) characterized in that it comprises at least one layer comprising:

60-75% (w/$w_t$) PS;
10-35% (w/$w_t$) EMP with a comonomer content of 15-40% w/$w_{EMP}$;
an active substance selected from the group consisting of antioxidant agent and antimicrobial agent;
0.5%-2% (w/$w_t$) MA;
0-15% (w/$w_t$) EA with an HLB greater than 8, with 3-15% (w/$w_t$) when the active substance is an antimicrobial agent; and
wherein the PS/(EMP+EA) ratio is between 1.2 and 7.5.

Said at least one layer comprises an active substance hereinafter referred to as "active layer".

Unless otherwise specified, the percentages used herein are given in percent by weight relative to the total weight of the layer (w/$w_t$), whether or not it is an active layer. The weight percentage is not given with respect to the total weight of the film because the film can have one layer (this being an active layer) or it can have multiple layers (at least one of them being an active layer).

The technical features of the film of the invention defined above result in a film in which it has been possible to maintain the functionality of the active substance it comprises, even though said substance is normally thermolabile, and which has good processability (e.g. the polymer mixture allows obtaining a homogeneous melt capable of flowing through the extruder without phase separation and transformable by the forming methods used for thermoplastics). Furthermore, the particular composition specified for the active layer allows the active substance to be evenly distributed within the layer's polymer matrix and to be released into the medium (e.g. food with which it is in contact), where it exerts its activity (e.g. antioxidant or antimicrobial). In this way, the film of the invention comprising an active layer, as defined in the present invention, efficiently provides antioxidant or antimicrobial protection to the food product that is in contact with said layer.

In a preferred embodiment of the film of the invention, the PS content is 64-70% (w/$w_t$), the EMP content is 16-30% (w/$w_t$) and the PS/(EMP+EA) ratio is between 1.5 and 4.4. As shown in the Examples, films according to this preferred embodiment provide antioxidant and antimicrobial protection in a surprisingly effective manner.

As shown in the Examples, the migration and antioxidant or antimicrobial activity depend on the film composition and it is essential that the film have a composition as defined in the present invention to efficiently provide an antioxidant or antimicrobial activity. Specifically, regarding the PS component, it is essential that the active layer/s has/have crystal polystyrene and not another polymeric material such as polyethylene (see Example 4). Thus, in a particular embodiment of the film of the invention, the active layer/s comprise/s only crystal polystyrene (PS) as a polystyrene component, that is, PS is the only polystyrene type material of the active layer/s (e.g. the active layer does not comprise HIPS). In another particular embodiment according to any one of the previous embodiments, the active layer/s do/does not comprise cellulose and/or polyethylene, more particularly the film of the invention according to any one of the embodiments of the first aspect of the invention does not comprise cellulose and/or polyethylene. Preferably, the active layer/s do/does not comprise any other polymeric material apart from PS and EMP.

In a particular embodiment of the invention, PS comprises different types of crystal polystyrene, more particularly PS comprises crystal polystyrenes with different MFI (acronym for Melt Flow Index). In a preferred embodiment according to any one of the previous embodiments, PS comprises PS with an MFI of between 10-40 g/10 min at 200° C. and 5 Kg (hereinafter referred to as PS1), more preferably 20-30 g/10 min at 200° C. and 5 Kg, and/or PS with an MFI of 2-5 g/10 min at 200° C. and 5 Kg (hereinafter referred to as PS2), more preferably 2.5-4 g/10 min at 200° C. and 5 Kg. As shown in the examples, advantageously the use of these PS1 and/or PS2 provides a high release and activity of the active substance.

In another preferred embodiment according to any one of the previous embodiments, PS comprises at least 37% (w/$w_t$) of PS2, which advantageously provides the film of the invention with excellent processability while maintaining the high release and activity of the active substance.

It is also essential that the active layer/s have/has EMP since, as shown in Examples 1 and 3, in the absence of EMP, neither a large release of the active substance nor an efficient antioxidant or microbial activity is achieved. In a particular embodiment, EMP is selected from the group consisting of ethylene vinyl acetate copolymer (EVA), ethylene methyl acrylate copolymer (EMA), ethylene ethyl acrylate copolymer (EEA), ethylene butyl acrylate copolymer (EBA) and mixtures thereof. EMP is preferably EVA. As shown in the Examples, the use of EVA as EMP results in high release and activity of the active substance.

In a particular embodiment of the invention, EMP comprises EMP with different MFI. In a preferred embodiment according to any one of the previous embodiments, EMP comprises EMP with an MFI of between 15-50 g/10 min at 190° C. and 2.16 Kg (hereinafter referred to as EMP1), more preferably 30-45 g/10 min at 190° C. and 2.16 Kg, and/or EMP with an MFI of 2-5 g/10 min at 190° C. and 2.16 Kg (hereinafter referred to as EMP2), more preferably 2.5-4 g/10 min at 190° C. and 2.16 Kg. Thus, when the EMP comprises EMP1, it can be EVA1, EMA1, EEA1, EBA1 or mixtures thereof, and when the EMP comprises EMP2, it can be EVA2, EMA2, EEA2, EBA2 or mixtures thereof. As shown in the examples, the use of these EMP1 and/or EMP2 advantageously provides a high release and activity of the active substance.

In another preferred embodiment according to any one of the preceding embodiments, EMP comprises at least 5% (w/w$_t$) of EMP2, which advantageously provides good processability to the film of the invention.

As indicated above, the active substance is evenly distributed in the polymeric matrix of the active layer, and said active substance is capable of migrating to the surface of the plastic. To control said migration and protect the active substance from any type of cleaning treatment carried out on the film, the active layer comprises 0.5%-2% (w/w$_t$) MA. Surprisingly, as shown in Example 6, the presence of the MA affects the migration of the active substance, since it makes the migration of the active substance slower during the first days because its size is greater than that of the MA, and also protects the active substance from cleaning carried out on the film, i.e. prevents or reduces the removal/loss of active substance due to any cleaning process, whether physical or chemical. In addition, since MA is present, it favors the processability of the film since it prevents the molten materials from sticking to the metal parts, facilitates the movement of the melt through the extruder and avoids the blockage of the bubble during its collapse allowing separating it in two symmetrical films.

In a particular embodiment according to any one of the embodiments of the preceding paragraph, the migration agent is selected from the group consisting of fatty acid amides, fatty acid esters except glycerol monolaurate (monolaurin), metal stearates, waxes and mixtures thereof. Preferably the MA is selected from the group consisting of erucamide, oleamide, glycerol monostearate and zinc stearate; and more preferably the MA is glycerol monostearate and/or erucamide.

In those cases where it is desired that the film provide antioxidant protection to the food product, the active substance will be an antioxidant agent. Thus, in a particular embodiment according to any one of the previous embodiments, the active substance is an antioxidant agent and this is selected from the group consisting of tocopherol, green tea extract, olive leaf extract, rosemary extract, grape seed extract, coffee extract, dehydrated acerola, citric extract with a concentration of flavonoids greater than 45%, tomato extract with a concentration of lycopene greater than 5%, fruit extract, thymol and mixtures thereof. Preferably the antioxidant agent is tocopherol or green tea extract.

In a particular embodiment according to any one of the previous embodiments, the active substance is an antioxidant agent and the content of the emulsifying agent is 0-5%, preferably 0-3%. The film of the invention is effective both in the absence of EA (see Examples 1 and 2), and in the presence thereof (data not shown). The presence of EA does not represent a great improvement in the release of the AO agent since, as can be seen in Examples 1 and 2, the release of AO in the absence of EA is close to 100%. Therefore, in a preferred embodiment, the film with antioxidant agent does not have EA, i.e. the EA content is 0%, thus being an advantageous embodiment in economic and processing terms (the more elements in the mixture, the processability becomes more complex).

In those cases where it is desired that the film provide antimicrobial protection to the food product, the active substance will be an antimicrobial agent. Thus, in a particular embodiment of the invention, the active substance is an antimicrobial agent, more particularly an AB or AF agent selected from those given in the particular and preferred embodiments given at the beginning of the detailed description of the present invention. These embodiments are applicable to any of the embodiments of the first aspect of the invention in which the active substance is not an antioxidant agent.

In a particular embodiment according to any one of the embodiments of the previous paragraph, the active substance is an antimicrobial agent and the EA content EA is 3-12%, preferably 5-10%. As shown in the examples, with said EA content it is possible to efficiently control the microbial population in the medium in contact with the film of the invention, while in the absence of EA said antimicrobial control is not achieved (see Example 5).

In a particular embodiment, EA agent is selected from the group consisting of polyethylene glycol 400 dioleate, polyoxyethylene (20) sorbitan monolaurate, polyoxyethylene (20) sorbitan monopalmitate, polyoxyethylene (20) sorbitan monostearate, polyoxyethylene (20) sorbitan triestearate, polyoxyethylene (20) sorbitan monooleate, polyoxyethylene sorbitan monooleate, ethylene polyoxide 40 stearate, sorbitan monolaurate, and mixtures thereof. Preferably, the EA is polyoxyethylene sorbitan monooleate.

Surprisingly, the films of the invention are antioxidant or microbiologically effective even when incorporating low concentrations of active substance in their composition, e.g. less than or equal to 6% w/w$_t$. Thus, in a particular embodiment according to any one of the previous embodiments, the content of the active substance is 0.5-6% (w/w$_t$). As shown in the Examples, films with active layers with concentrations as low as 0.9% tocopherol and 1.37% AM agent efficiently provide the medium with antioxidant and antimicrobial activity, respectively.

In a preferred embodiment, the polystyrene film of the first aspect of the invention according to any one of the previous embodiments, comprises at least one layer consisting of:
    60%-75% (w/w$_t$) PS;
    10%-35% (w/w$_t$) EMP with a comonomer content of 15-40% w/w$_{EMP}$;
    0.5-6% of an active substance selected from the group consisting of an antioxidant and an antimicrobial agent;
    0.5%-2% (w/w$_t$) MA;
    0%-15% (w/w$_t$) EA with an HLB greater than 8, being 3-15% (w/w$_t$) when the active substance is an antimicrobial agent;
    wherein the PS/(EMP+EA) ratio is between 1.2 and 7.5; and
    wherein the total sum of the components is 100% by weight with respect to the total weight of said at least one layer (i.e. of the active layer).

As shown in the Examples, films, in which the active layer has a composition according to the preceding paragraphs, are capable of releasing a functional active substance and of providing antioxidant or antimicrobial properties to the medium (e.g. food product) in contact with said film. Furthermore, the films of the invention have properties that allow good processability as indicated above, and have mechanical features that result in excellent cutting properties. These cutting properties allow the films to be sliced at speeds greater than 650 cuts/minute, and more particularly at speeds of up to 1,200 cuts/minute, thus achieving excellent product stacking without burrs or irregular cuts. They are also highly non-stick films, with antistatic properties, allowing easy separation of the slices without sticking, and are adjustable for all the slicers available on the market.

Thus, in a particular embodiment according to any one of the previous embodiments according to the first aspect of the invention, the film of the invention has a tensile strength in the machine and transverse direction greater than 20 MPa, and an elongation at break in the machine and transverse direction greater than 20%. More particularly, it has tensile strength in the machine direction greater than 30 MPa and in the transverse direction greater than 20 MPa, and an elongation at break in the machine direction greater than 40% and in the transverse direction greater than 45%. These mechanical properties are widely known to the person skilled in the art and have been obtained in accordance with the UNE-EN ISO 527-3 standard.

As indicated above, the film of the present invention can be monolayer or multilayer. If the film is multilayer, the film comprises at least two layers, at least one of which is an active layer.

In a particular embodiment according to any one of the previous embodiments, the film is monolayer and has a total thickness of 10-300 microns, preferably 40-80 microns. In another particular embodiment, the film is multilayer and has a total thickness of 20-300 microns, preferably 30-80 microns. In both monolayer and multilayer embodiments, the thickness of each active layer is at least 10 microns.

The arrangement of the layers of the multilayer film must be such that it allows the contact of at least one active layer with the food product (i.e. the active layer is at least one of the outer layers of the film), in order to provide antioxidant or antimicrobial protection to said product. Thus, in a particular embodiment, the film is multilayer and the active layer is an outer layer of said film, i.e. may be in contact with the food product. In another particular embodiment, the film is multilayer and comprises at least one active layer and at least one layer without active substance (hereinafter referred to as "non-active layer"). The composition of the layer without active substance can be such that it provides beneficial properties for the processability of the film or for its slicing. This is the case of a film in which the non-active layer comprises crystal polystyrene and high impact polystyrene (HIPS). Thus, in a particular embodiment, the multilayer film comprises at least one active layer according to any one of the embodiments described in the first aspect of the invention and at least one non-active layer comprising crystal polystyrene and HIPS. More particularly, said non-active layer comprises 60-90% w/w$_t$, preferably 65-75% w/w$_t$, of crystal polystyrene and 10-40% w/w$_t$, preferably 25-35% w/w$_t$, of HIPS, More preferably, said non-active layer consists of 60-90% w/w$_t$, preferably 65-75% w/w$_t$ of crystal polystyrene and 10-40% w/w$_t$, preferably 25-35% w/w$_t$ of HIPS, so that its composition is 100% w/w$_t$.

Preferably, the film of the invention according to any one of the previous multilayer embodiments, comprises three layers, wherein each of the two outer layers is an active layer as defined in any one of the previous embodiments, and wherein the intermediate layer is a non-active layer as defined in any one of the previous embodiments. More preferably, the three-layer film consists of the three layers defined in this paragraph.

As shown in Example 2, the multilayer films defined in the previous paragraphs show excellent antioxidant and cutting properties, making them suitable for use as interleavers.

Finally, in a particular embodiment according to any one of the embodiments described in the first aspect of the invention, the film of the invention is tube-shaped.

The film of the present invention can be used to prepare a slice separating film, since as indicated above it has excellent cutting properties and is slicable by slicing machines at speeds greater than 650 cuts/minute, and more particularly up to 1,200 cuts/minute. In addition, thus, said slice separator provides the active substance to each slice that is in contact with it through its active layer. Thus, a second aspect of the invention relates to a slice separator comprising a film according to any one of the embodiments of the first aspect of the invention. More particularly, the separator consists of a film according to any one of the embodiments described in the first aspect of the invention.

In addition to its use as a slice separator, the film of the invention can be used to make a food wrap or package. Thus, a third aspect of the invention refers to a food wrap or package characterized in that it is manufactured from or comprises a film according to any one of the embodiments described in the first aspect of the invention. As indicated above, the active layer of the film must be in contact with the food product in order to provide it with antioxidant or antimicrobial protection. In a particular embodiment, said food package consists of film according to any one of the embodiments described in the first aspect of the invention. The food package can be in the form of a tray, bag, bag in box, doy-pack, flow-pack, etc. The food wrap may be in the form of a band, tube, etc.

Taking all of the above into account, in a fourth aspect, the present invention refers to the use of a film according to any one of the embodiments described in the first aspect of the invention for packaging food products or as a food product separating film, particularly food product slice separator. As indicated above, by using the film of the invention an antioxidant or antimicrobial protection is efficiently provided to the food product in contact with it.

The microbiological risks of food products are still one of the main sources of food-borne diseases today. Listeriosis is the most critical food-borne disease in the European Union and the USA, with a high mortality rate of around 13%. The fact that *L. monocytogenes* can grow at refrigeration temperatures (2-4° C.), causes the presence of this pathogen in ready-to-eat products with a relatively long shelf life, such as products derived from fishing, cooked meat products, fermented sausages and cheeses, being a matter of special concern for food security. On the other hand, the presence of lactic acid bacteria in food products causes changes in their sensory attributes. Surprisingly, the film of the present invention provides excellent antimicrobial properties against lactic acid bacteria and *Listeria* (see Examples 3-6). Likewise, the slices separators, packages and wrappings that comprise it also do so.

Finally, in a fifth aspect, the present invention refers to a method (method of the invention) for producing the film of the invention, characterized in that it comprises the following steps:

a) providing a polymer composition comprising:
60-75% (w/w$_t$) PS,
10-35% (w/w$_t$) EMP with a comonomer content of 15-40% w/w$_{EMP}$,
an active substance selected from the group consisting of an antioxidant agent and an antimicrobial agent,
0.5%-2% (w/w$_t$) MA,
0-15% (w/w$_t$) EA with an HLB greater than 8, being 3-15% when the active substance is an antimicrobial agent,
wherein the PS/(EMP+EA) ratio is between 1.2 and 7.5; and b) forming a film with at least one layer comprising said polymer composition.

The particular embodiments of PS, PS1, PS2, EMP, EMP1, EMP2, EA, MA, active substances and PS/(EMP+EA) ratio given for the first aspect of the invention are applicable to the fifth aspect of the invention. Likewise, the embodiments given in relation to the type of film (monolayer or multilayer) are applicable.

In a particular embodiment of the method of the invention, the EA and/or the active substance are added to the composition of a) in the form of a concentrate or masterbatch, selecting the most suitable matrix according to its melting point, polarity and viscosity. Thus, in a preferred embodiment, the EA concentrate or masterbatch is prepared in PS, preferably in PS1, and/or the active substance concentrate or masterbatch is prepared in PS or EMP, preferably in PS1 or EMP1. By preparing the masterbatches in these components, a very good stability of the EA and of the active substance and its homogeneous distribution in the polymer matrix are achieved. In a particular embodiment the masterbatch comprises 15%-40% EA or active substance, preferably 20-35%, by weight based on the weight of the masterbatch.

In a particular embodiment of the method of the invention according to any one of the previous embodiments, in step b) the film is formed by coextrusion, extrusion-blown, extrusion of double or triple bubble film, extrusion-flat film or cast, thermoforming, laminating, or blow-molding.

When the active substance is supplied to the polymer composition in the form of a concentrate, and the film is formed by any type of extrusion, said active substance undergoes two extrusion processes, one for the concentrate and the other for the final film. Surprisingly, despite said double extrusion process, and thanks to at least the particular features of the polymer composition, the active substance migrates towards the surface of the film, is released and maintains its functionality.

The active substance, EA and MA can be added to the polymer composition by physically mixing in an in-line mixer, before entering the extruder hopper, or without doing such premixing. Thus, in a particular embodiment of the method of the invention according to any one of the previous embodiments, the active substance is added to the plastic resin by physically pre-mixing in an in-line conditioned mixer, before being formed. In another particular embodiment, the active substance is added without making said premixing.

Finally, the fifth aspect of the invention also refers to a film obtainable by the method of the invention as defined in any one of the previous embodiments. This film has excellent cutting properties and antioxidant or antimicrobial activity depending on the active substance it comprises. This film as well as the film of the first aspect of the invention can be used as a slice separator, and for preparing food wrappers or packages, as indicated in the second, third and fourth aspects of the invention.

EXAMPLES

Specific examples of embodiment of the invention are detailed below, which serve to illustrate the invention without limiting the scope thereof.

Example 1: Film with Antioxidant Activity—EMP Component

Two monolayer films with the composition indicated in Table 1 were prepared, wherein components are hereinafter abbreviated as "comp.", the content ("cont.") of each of them is given in percentage by weight based on the total weight of each layer (% w/w$_t$). In the case that the film is monolayer, that % is the same as if it were given based on the total weight of the film. The EMP used was EVA.

TABLE 1

| | Composition | |
|---|---|---|
| Film | Comp. | Cont. (% w/w$_t$) |
| With EMP | PS2 | 66.97 |
| | EVA2 | 28.70 |
| | PS1 | 2.33 |
| | Nutrabiol ® T90 | 1.00 |
| | Glycerol monostearate | 1.00 |
| Without EMP | PS2 | 66.97 |
| | HIPS | 28.70 |
| | PS1 | 2.33 |
| | Nutrabiol ® T90 | 1.00 |
| | Glycerol monostearate | 1.00 |

The film production process was blown extrusion. In this process, the resin pellets are fed through a hopper to an extruder, here, the heat and friction convert the pellets into a melt that is forced through a ring to form a bubble. The bubble is then flattened by the collapse of the calender, stretched across the pressure rollers, and conveyed over the free rollers to a rewinder that produces the finished rolls of film EVA2 has been purchased from DuPont trading company (ELVAX®265A), while PS1 has been purchased from Versalis trading company (N3910). Also, the PS2 has been purchased from the Styrolution trading company (PS 165N/L). HIPS has been purchased from Styrolution (HIPS 486N). Glycerol monostearate has been purchased from the Palsgaard trading company (Einar 204). The active substance is incorporated by means of a masterbatch that can be made in both PS1 and EVA1. Similarly, the EA additive is introduced into the process of obtaining the film through a masterbatch made in PS1. The masterbatches were prepared at a concentration of 30% EA or active substance (% by weight based on the total weight of the masterbatch).

In the rest of the examples, these compounds PS1, PS2 and EVA2, and the same production process of the film are used, unless otherwise indicated.

In the present case, the active substance was an antioxidant, specifically, it was a concentrate rich in natural tocopherols from non-GMO vegetable oil at a concentration of 90% tocopherols from the BTSA trading company (Nutrabiol® T90) under the following numbers CAS: 59-02-9/16698-35-4/54-28-4/119-13-1, and the antioxidant masterbatch was made in PS1.

1.1.—Release of the Antioxidant Agent

A sample of specific dimensions is taken from each of the films under study and is introduced in a certain amount of methanol, to reach a given ppm, during the indicated times. After this time, the sample is analyzed by HPLC and the amount of Tocopherol released at each time is determined. One sample is prepared for each time, which is analyzed at a given time, that is, it is not a single sample that is prepared for taking an aliquot for each time. In this way, as many samples as scheduled times have been prepared and analyzed.

In this case, 150 mg of the film was introduced in 3 ml of methanol to achieve a concentration of 500 ppm of tocopherol in the methanolic extract, considering that all the tocopherol migrated to the solvent, and samples were taken on days 1, 3 and 6. Results are shown in Table 2.

TABLE 2

Percentage of tocopherol released per day

| Days | Film with EMP, % released | Film without EMP, % released |
|---|---|---|
| 1 | 32 | 1 |
| 3 | 44 | 2 |
| 6 | 49 | 2 |

The results show that the film with EMP, in this case with EVA, is capable of releasing tocopherol as the days go by, however the film without EMP, in this case without EVA, is not capable of releasing tocopherol.

1.2.—In Vitro Antioxidant Activity—DPPH Test

The DPPH test allows evaluating the ability to scavenge free radicals from antioxidant substances.

0.1 g of film was placed in tubes containing 2 ml of DPPH (1,1-diphenyl-2-picril-hydrazyl) solution in methanol (50 mg/l). The tubes were kept in the dark and under constant stirring for 30 minutes. The absorbance of the sample was measured at 515 nm in a spectrophotometer (UV-1700 Pharma Spec, Shimadzu) using methanol as a target to remove the absorbance of the solvent at that wavelength.

As the DPPH present in the sample is reduced by the antioxidants present in the film, the solution loses coloration proportionally to the presence of the antioxidant.

The antioxidant activity of the samples was expressed as the percentage of oxidation inhibition (PI) according to the following formula:

$$PI = \left(1 - \frac{A\ sample}{A\ control}\right) \times 100$$

wherein Asample is the absorbance of the sample and Acontrol is the absorbance of the DPPH solution. The higher the PI value, the greater the antioxidant capacity.

The test was carried out in triplicate. Table 3 shows the mean values of the results of the three tests.

TABLE 3

Percentage of oxidation inhibition

| Sample | PI |
|---|---|
| Control | 2.85 |
| With EMP | 96.17 |
| Without EMP | 15.38 |

The results show that the film with EMP, in this case with EVA, has an antioxidant activity of almost 100%, while the antioxidant activity of the film without EMP, in this case without EVA, is much lower, approximately 15%.

Example 2: Film with Antioxidant Activity—Multilayer

Two three-layer films were prepared with the composition shown in Table 4.

TABLE 4

Composition of three-layer films

| Film | LAYER A Comp. | LAYER A Cont. (%) | LAYER B Comp. | LAYER B Cont. (%) | LAYER C Comp. | LAYER C Cont. (%) |
|---|---|---|---|---|---|---|
| Three-layer invention | PS2 | 66.97 | PS | 70 | PS2 | 66.97 |
|  | EVA2 | 28.70 | HIPS | 30 | EVA2 | 28.70 |
|  | PS1 | 2.33 |  |  | PS1 | 2.33 |
|  | Nutrabiol ® T90 | 1.00 |  |  | Nutrabiol T90 | 1.00 |
|  | Glycerol monostearate | 1.00 |  |  | Glycerol monostearate | 1.00 |
| Control | PS | 70 | PS | 70 | PS | 70 |
|  | HIPS | 30 | HIPS | 30 | HIPS | 30 |

Layers A and C are the outer layers and layer B is between them (intermediate layer). Thus, layers A and C, which may be in contact with the food, comprise the antioxidant agent.

The thickness of the film of the invention was 60 microns and the thickness of layer A=B=10 microns. The thickness of the control film was 60 microns, where the thickness of the layer A=B=C=20 microns.

The film was obtained by means of a blown extrusion process as in Example 1 with the exception that the components of each layer are fed to a different extruder and the layers are joined at the extrusion head before forming the bubble.

2.1.—Release of the Antioxidant Agent

The test to determine the amount of tocopherol released by the film was carried out as explained in Example 1.1. In this case, films of 40×40 mm dimensions were introduced in 5 ml of methanol to achieve a tocopherol concentration of 79.46 ppm in the methanolic extract, considering that all the tocopherol migrated to the solvent, and samples were taken on days 0, 1, 2, 3, 6, 9, 15 and 21. The results are shown in Table 5.

TABLE 5

Percentage of tocopherol released per day

| Days | % released |
|---|---|
| 0 | 0 |
| 1 | 70 |
| 2 | 76 |
| 3 | 85 |
| 6 | 78 |
| 9 | 92 |
| 15 | 100 |
| 21 | 86 |

Thus, it is seen that the multilayer film (in this case three-layer) of the invention, like the monolayer, is capable of releasing tocopherol as days go by.

This film has excellent cutting properties (tensile strength in the machine direction>30 MPa and in the transverse direction>20 MPa and elongation at break in the machine direction>40% and in the transverse direction>45%), which makes it ideal for use as an interleaver in slicing machines that work at cutting speeds well above 650 cuts/minute, achieving excellent product stacking without burrs or irregular cuts. The cutting properties were characterized according to ISO 527-3.

2.2.—In Vitro Antioxidant Activity—TROLOX Test

The TROLOX test allows evaluating the ability to scavenge free radicals from antioxidant substances. This test was carried out as follows:

The 110 mm×110 mm film is cut into small pieces, accurately weighed and crushed with ultraturrax. It is mixed with 20 ml of methanol in 50 ml falcon tubes and vortexed for 3 minutes and incubated at room temperature for 3 hours. Subsequently, it is vortexed for 3 minutes and centrifuged at 2,300 rpm for 10 minutes. The supernatant is collected for colorimetric determination.

Before performing the colorimetric determination, a dilution test of the sample with DPPH is performed to know which the calibration range will be. In addition, five serial dilutions are made starting from the initial dilution and 0.9 ml of sample are taken from each dilution to which 0.9 ml of DPPH is added. The samples are incubated for 2.5 h in the dark and finally measured at 515 nm.

The calibration line is made with Trolox (0-60 μM) and the results are shown in Table 6 as meqTROLOX/100 g of sample.

TABLE 6

| Antioxidant capacity | | |
|---|---|---|
|  | Control | Three-layer invention |
| meq TROLOX/100 g | 0 | 215 ± 22 |

Thus, it is seen that the multilayer film (in this case three-layer) of the invention, has antioxidant activity since it is capable of consuming 215 meq of TROLOX per 100 g of sample, while the control film is not capable of consuming any meq of the substance.

2.3.—In Vivo Antioxidant Activity—Challenge Test

The three-layer film of the invention with tocopherol as an active substance that, according to in vitro studies in section 2.2, showed antioxidant activity, was used to evaluate the impact it has on the quality of a meat product (salami) during its useful life.

A minced cured product (salami) was used to ensure product uniformity. The product was vacuum packed using the antioxidant film or the control film of Table 4 as the slice separator (interleaver)

An accelerated useful life study was carried out in order to obtain a validation of the activity of the films. The product was kept at room temperature (22° C.) to speed up the test, since the product should be stored under refrigeration at 8° C., in displays under commercial lighting conditions. During the useful life of the product, sampling was carried out on days 1, 6, 13, 20, 27 and 41 to determine the evolution of product quality. Specifically, oxidation levels were analyzed (TBARS test), and their organoleptic features.

The TBARS index (substances reactive to thiobarbituric acid) was used as an indicator of the level of lipid oxidation of salami. The TBARS index was determined following an method adaptation proposed by Buege and Aust (Buege, J. A. and Aust, S. D. (1978) Microsomal Lipid Peroxidation. Methods in Enzymology, 52: 302-310). 2 g of salami were homogenized for 30 s in an ULTRA-TURRAX® mixer using 20 ml of 1.2 M HCl solution, 0.1% (w/v) propyl gallate and 0.1%, w/v EDTA. The homogenate was centrifuged at 5,000 rpm for 10 min. The supernatant was injected into a Futura System continuous flow analyzer (Alliance Instruments). A solution of 1.2M HCl, 0.327% thiobarbituric acid and 0.5% Brij-35 was also injected into the system. The system consists of a bath at 90° C. that allows speeding up the reaction and a colorimeter set at 531 nm that makes it possible to detect the reaction product, malondialdehyde (MDA). The calibration line was obtained using 1,1,3,3-tetraethoxypropane as standard. The results were expressed as mg MDA/kg salami.

The interleaver size was 90×90 mm and the weight of the salami slices was 7 g.

The results obtained were those shown in Table 7.

TABLE 7

| Results of the TBARS test | | |
|---|---|---|
|  | TBARS (mg MDA/Kg salami) | |
| Days | Control | Three-layer invention |
| 1 | 0.47 | 0.48 |
| 6 | 0.87 | 0.67 |
| 13 | 2.14 | 1.47 |
| 20 | 2.58 | 1.94 |
| 27 | 2.61 | 2.04 |
| 41 | 3.35 | 2.82 |

During the test, the antioxidant effect of the three-layer film of the invention could be detected in the salami. The sliced salami samples packaged using the three-layer film of the invention as interleaver and stored at room temperature (22° C.) under lighting conditions (870 lux on average; 12 h light+12 h dark) showed lower oxidation values during the shelf life of the product than the samples in the control batch. Significantly lower TBARS values (mg MDA/kg product) were detected in the batches with the three-layer film of the invention compared to the control batch from day 13 of storage and until the end of the study (t41).

A comparison between batches detected a less rancid aroma and flavor in the batches with the three-layer film of the invention compared to the control batch. On the other hand, no differences were detected in the color of the product between the types of film under study (instrumental and sensory measurement). From the results obtained, it can be concluded that under the test conditions (product, environmental conditions, manufacturing lots) the three-layer film of the invention made it possible to delay the lipid oxidation of salami.

Example 3: Film with Antibacterial Activity—EVA Component

Three monolayer films with the composition specified in Table 8 were prepared.

TABLE 8

| Composition | | |
|---|---|---|
| Film | Comp. | Cont. (% w/$w_t$) |
| With EMP | PS2 | 44.22 |
|  | EVA2 | 13.12 |
|  | PS1 | 23.33 |
|  | EVA1 | 5.83 |
|  | Tween® 80 | 10.00 |
|  | Mirenat® D | 2.50 |
|  | Glycerol monostearate | 1.00 |
| Without EMP | PS2 | 44.22 |
|  | HIPS | 13.12 |
|  | PS1 | 23.33 |
|  | HIPS | 5.83 |
|  | Tween® 80 | 10.00 |
|  | Mirenat® D | 2.50 |
|  | Glycerol monostearate | 1.00 |
| CONTROL | PS2 | 45.97 |

TABLE 8-continued

| Film | Comp. | Cont. (% w/w$_t$) |
|---|---|---|
| | EVA2 | 19.70 |
| | PS1 | 23.33 |
| | Tween® 80 | 10.00 |
| | Mirenat® D | 0 |
| | Glycerol monostearate | 1.00 |

The antibacterial agent used was Mirenat® D from the commercial company VEDEQSA, which has between 53-57% of ethyl N$^\alpha$-dodecanoyl-L-argininate hydrochloride (LAE-Cl) (CAS No. 60372-77-2). Mirenat® D was incorporated into the film by means of a masterbatch made in the EVA1 component. EVA1 was purchased from DuPont (ELVAX®240A). Tween80® was purchased from Quimidroga (Polysorbate 80.PS80). The rest of the components are the same as specified in Example 1.

3.1.—Release of AB Agent

A sample having specific dimensions is taken from each of the films under study and is introduced in a certain amount of water, to reach a given ppm, during the indicated times. After this time, the sample is analyzed by HPLC and the amount of LAE released at each time is determined. Each time corresponds to a sample, that is, as many samples as scheduled times are analyzed.

In this case, 100 mg of film was introduced into 15 ml of water, which resulted in 117 ppm of LAE, considering that all LAE migrates to the solvent, and samples were taken on days 0, 1, 2, 3, 6, 9, 15 and 28. The results are shown in Table 9.

TABLE 9

Percentage of LAE released per day

| | % LAE released/day | |
|---|---|---|
| Days | With EMP | Without EMP |
| 0 | 0 | 0 |
| 1 | 43 | 13 |
| 2 | 80 | 19 |
| 3 | 80 | 21 |
| 6 | 83 | 44 |
| 9 | 79 | 46 |
| 15 | 80 | 49 |
| 28 | 82 | 42 |

The presence of EMP, in this case EVA, facilitates the release of LAE reaching a release percentage of more than 80%, while if there is no EMP, in this case EVA, in the formulation the maximum percentage of release is only 50%

3.2.—Antimicrobial Activity

The antimicrobial activity of the films was evaluated using the culture broth method that allows the antimicrobial activity to be determined under in vitro conditions. The culture broth method allows monitoring the behavior of the microorganisms under study during storage under refrigerated conditions. Briefly, culture broth tubes (MRS/TSBYE) are inoculated with the selected strains at 2 levels (101 and 105 CFU/g) and a film sample is placed in said tubes to study the inhibitory effect of the films. The weight of the sample to be added will be determined based on the equivalent ppm of LAE (mg LAE/kg broth) that are intended to be studied. The samples are kept at a temperature of 8° C. for a period of 35 days or until the stationary phase of growth is reached.

These methods were used to evaluate the antibacterial activity of AB (antibacterial) films against lactic acid bacteria (BAL) and/or against *Listeria monocytogenes*. BALs were used as indicators of the deterioration of cooked meat products. Specifically, BAL isolated from deteriorated cooked meat products (*Lactobacillus* sakei and *Leuconostoc mesenteroides*) were used. On the other hand, *L. monocytogenes* was used as a target pathogen, due to its prevalence in meat products. The strains used were also isolated from meat products.

Figure 1B:
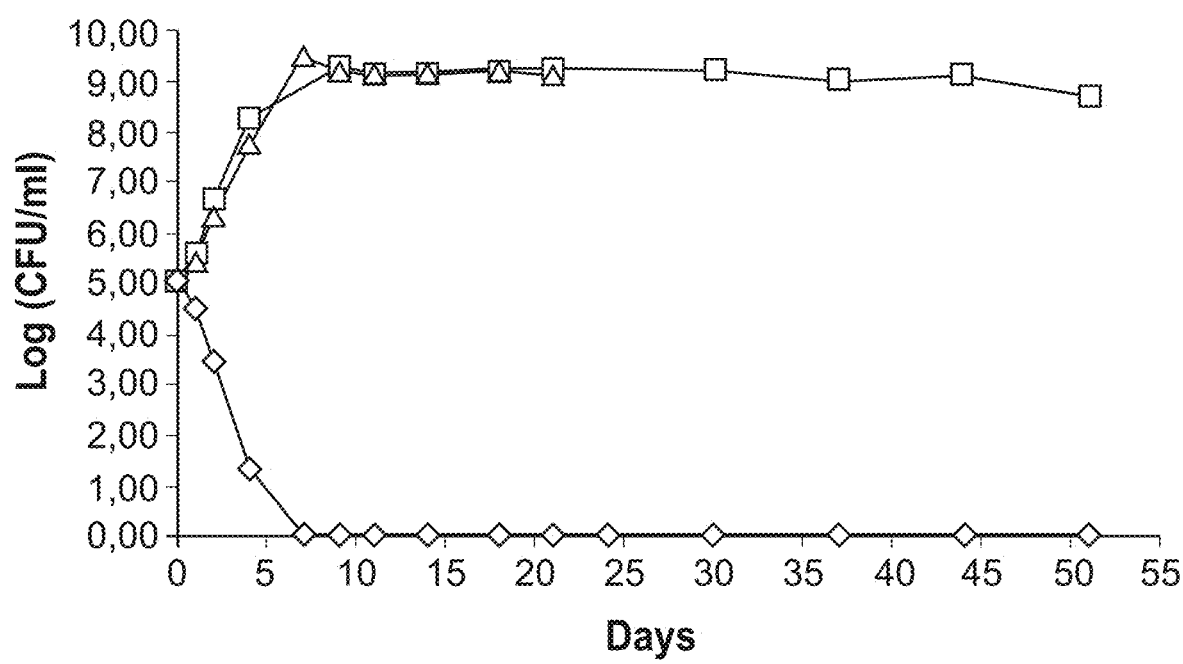

In this case, the test was carried out with *L. monocytogenes* and with 117 ppm of LAE. As can be seen in FIG. 1, the film of the present invention (with EVA) shows bactericidal activity both at a concentration of $10^1$ bacteria (FIG. 1A) and at a concentration of $10^5$ (FIG. 1B). The study has been carried out at two concentrations, one being very high and unhealthy for humans, which could correspond to a peak of contamination, and another being lower, in order to demonstrate the antimicrobial capacity of the films regardless of the concentration of microorganism present. With this example it can be seen how, even if a very high *Listeria* peak is present, the film of the invention would be able to reduce it to minimum values, thus avoiding future intoxication problems.

FIG. 1 also shows that the EMP component is essential for the film to show said bactericidal activity since with the film with/without EMP the bacterial growth is the same as the control regardless of the initial concentration of *Listeria*.

Example 4: Film with Antibacterial Activity—PS Component

Three monolayer films with the composition specified in Table 10 were prepared as indicated in Example 3. In the film without PS, low-density polyethylene (LDPE) (from Dow Chemical, grade LDPE410E) was used instead of PS.

TABLE 10

| | Composition | |
|---|---|---|
| Film | Comp. | Cont. (%) |
| With PS | PS2 | 44.22 |
| | EVA2 | 13.12 |
| | PS1 | 23.33 |
| | EVA1 | 5.83 |
| | Tween® 80 | 10.00 |
| | Mirenat® D | 2.50 |
| | Glycerol monostearate | 1.00 |
| Without PS | LDPE | 44.22 |
| | EVA2 | 13.12 |
| | LDPE | 23.33 |
| | EVA1 | 5.83 |
| | Tween® 80 | 10.00 |
| | Mirenat® D | 2.50 |
| | Glycerol monostearate | 1.00 |
| Control | LDPE | 45.97 |
| | EVA2 | 19.70 |
| | LDPE | 23.33 |
| | Tween® 80 | 10.00 |
| | Mirenat® D | 0 |
| | Glycerol monostearate | 1.00 |

4.1.—Release of the AB Agent

The test was carried out as explained in section 3.1, taking samples on the days indicated in Table 11. The results obtained appear in Table 11.

TABLE 11

LAE release results

| | % LAE released/day | |
|---|---|---|
| Days | With PS | Without PS |
| 0 | 0.0 | 0.0 |
| 3 | 72.3 | 22.5 |
| 9 | 76.8 | 35.1 |
| 13 | 73.4 | 32.7 |
| 16 | 70.8 | 37.1 |
| 20 | 72.6 | 36.0 |
| 24 | 74.7 | 41.6 |

The presence of the PS facilitates the release of the LAE reaching a release percentage of almost 80%, while if there is no PS, the maximum release percentage is only approximately 40%.

4.2.—Antimicrobial Activity

The test was carried out as in section 3.2, with *L. monocytogenes* and with 117 ppm of LAE.

Figure 2A:
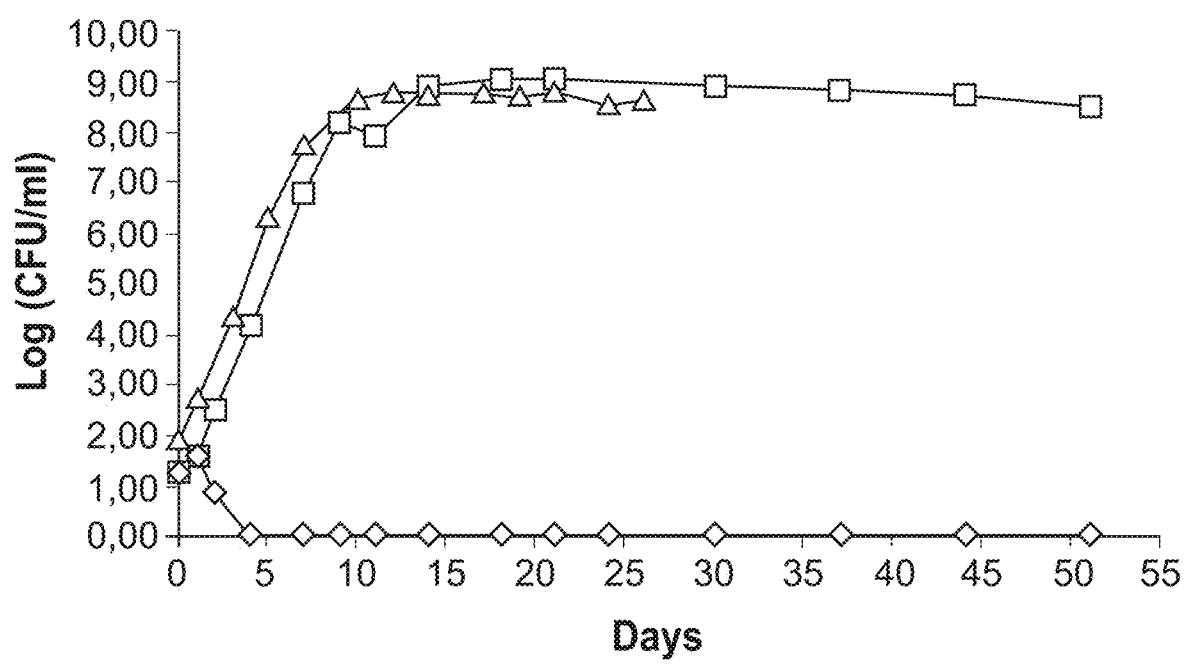
FIG. 2: Graphical representation of bacterial growth (in log CFU/ml) as a function of time (in days), where the red square is the control, the blue triangle is the film without PS and the green diamond is the film with PS. In panel A the initial concentration of *Listeria* was $10^1$-$10^2$ and in panel B $10^5$-$10^6$.
Figure 2B:
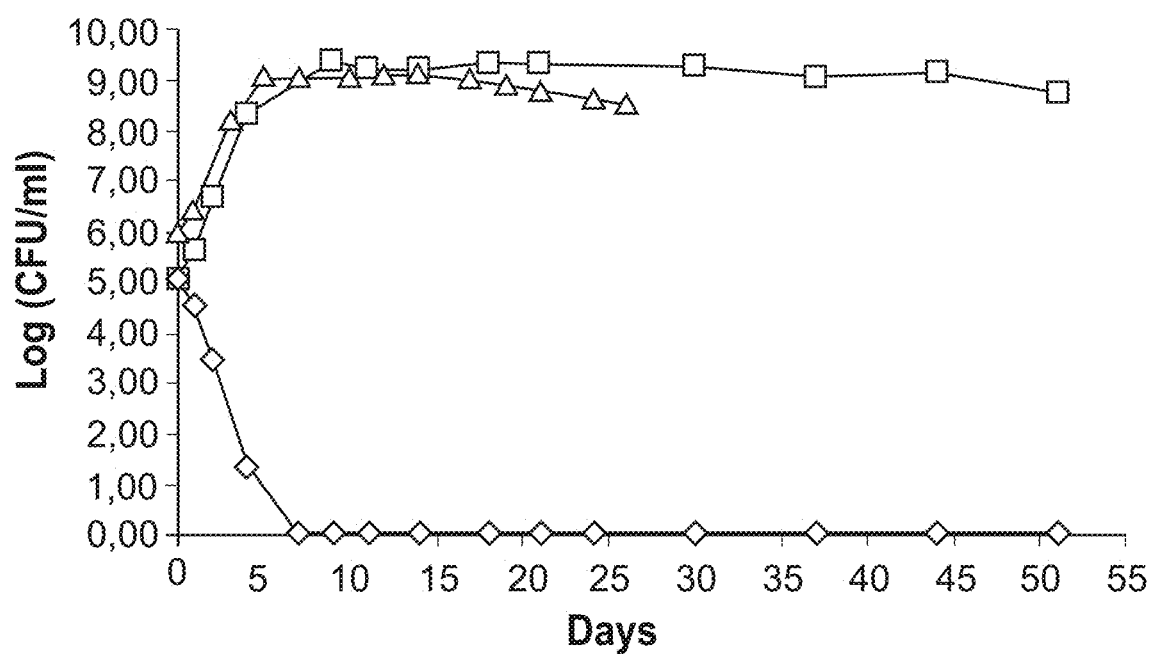

As shown in FIG. 2, the film with PS (rhombus) has a bactericidal effect, while the film with LDPE (triangle) does not have any type of effect, since bacterial growth is the same as with the control film (square), regardless of the initial concentration of *Listeria* (comparison panels A and B).

Thus, it is essential that the layer with the active substance comprises PS

Example 5: Film with Antimicrobial Activity—EA Component

Three monolayer films with the composition specified in Table 12 were prepared:

TABLE 12

Composition

| Film | Comp. | Cont. (%) |
|---|---|---|
| Without EA | PS2 | 67.55 |
| | EVA2 | 23.12 |
| | EVA1 | 5.83 |
| | Tween ® 80 | 0 |
| | Mirenat ® D | 2.50 |
| | Glycerol monostearate | 1.00 |
| With EA | PS2 | 44.22 |
| | EVA2 | 13.12 |
| | PS1 | 23.33 |
| | EVA1 | 5.83 |
| | Tween ® 80 | 10.00 |
| | Mirenat ® D | 2.50 |
| | Glycerol monostearate | 1.00 |
| Control | PS2 | 45.97 |
| | EVA2 | 19.70 |
| | PS1 | 23.33 |
| | Tween ® 80 | 10.00 |
| | Mirenat ® D | 0 |
| | Glycerol monostearate | 1 |

5.1.—Release of the AB Agent

The test was carried out as explained in section 3.1, taking samples on the days indicated in Table 13. The results obtained appear in Table 13.

TABLE 13

LAE release results

| | % LAE released/day | |
|---|---|---|
| Days | With EA | Without EA |
| 0 | 0.0 | 0.0 |
| 3 | 72.3 | 4.8 |
| 9 | 76.8 | 7.1 |
| 13 | 73.4 | 4.5 |
| 16 | 70.8 | 6.1 |
| 20 | 72.6 | 4.2 |
| 24 | 74.7 | 4.4 |

The presence of the EA facilitates the release of LAE reaching a release percentage of almost 80%, while if there is no EA, the maximum release percentage is only approximately 7%.

5.2.—Antimicrobial Activity

Figure 3A:
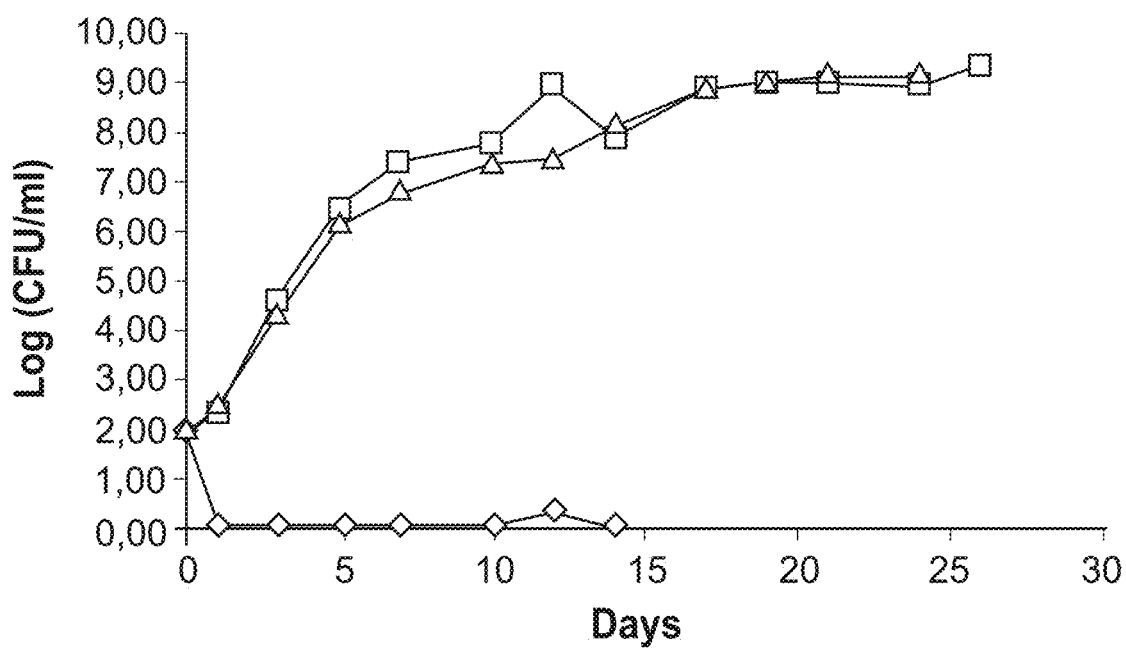
FIG. 3: Graphical representation of bacterial growth (in log CFU/ml) as a function of time (in days), where the red square is the control, the blue triangle is the film without EA and the green rhombus is the film with EA. In panel A the initial concentration of Listeria was $10^2$ and in panel B $10^6$.
Figure 3B:
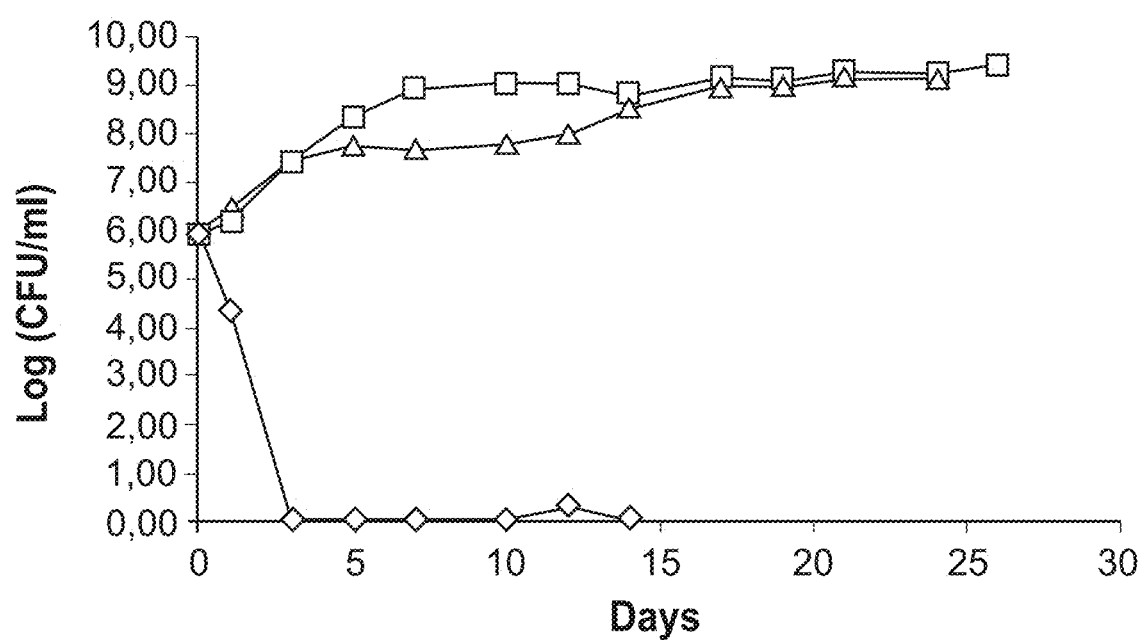
Figure 4:
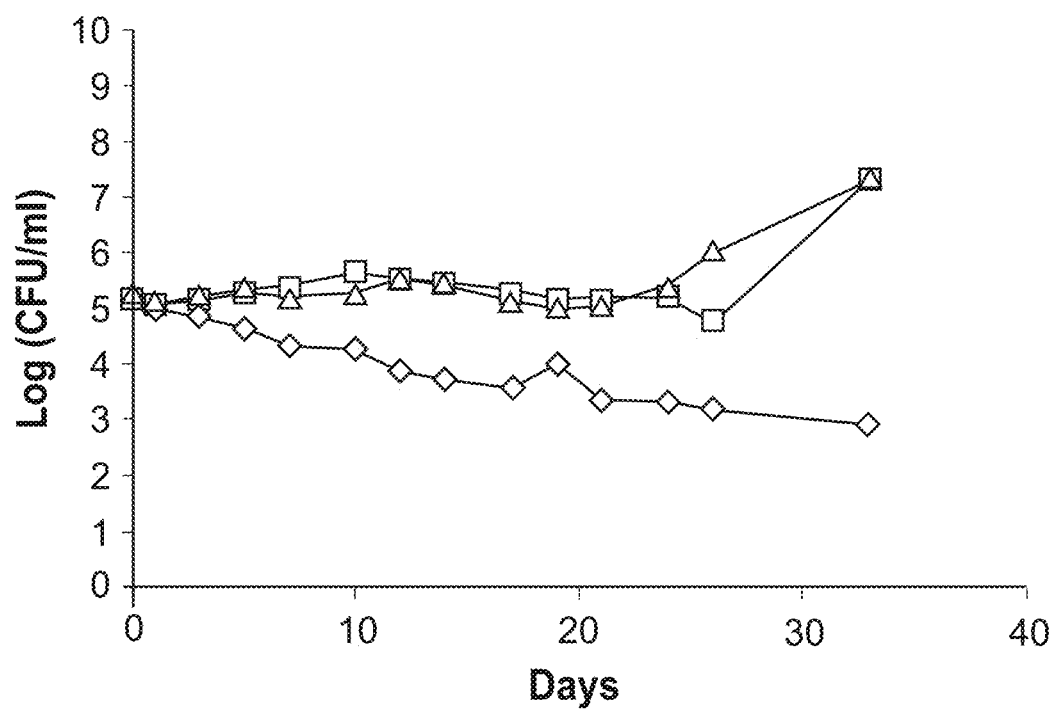
FIG. 4: Graphical representation of bacterial growth (in log CFU/ml) as a function of time (in days), where the red square is the control, the green diamond is the film with EA and the blue triangle is the film without EA. The initial concentration of lactic acid bacteria was $10^5$.

The test was carried out as in section 3.2, with 117 ppm of LAE and with *L. monocytogenes* at a concentration of $10^2$ (FIG. 3.A) or $10^6$ (FIG. 3.B) or with BAL at a concentration of $10^5$ (FIG. 4).

As for *Listeria*, as shown in FIG. 3, the film with EA (rhombus) has a bactericidal effect, while the film without EA (triangle) does not have any type of effect, since bacterial growth is the same as with the control film (square), regardless of the initial concentration of *Listeria* (comparison panels A and B).

As for BAL, as shown in FIG. 4, the film with EA (rhombus) has a bacteriostatic effect compared to the control film (square), while the film without EA (triangle) does not have any type of effect against BAL.

Example 6: MA Component

Three monolayer films with the following composition (Table 14) were prepared, as indicated in Example 3.

TABLE 14

Composition

| Film | Comp. | Cont. (% w/$w_t$) |
|---|---|---|
| With MA | PS2 | 44.22 |
| | EVA2 | 13.12 |
| | PS1 | 23.33 |
| | EVA1 | 5.83 |
| | Tween ® 80 | 10.00 |
| | Mirenat ® D | 2.50 |
| | Glycerol monostearate | 1.00 |
| Without MA | PS2 | 45.22 |
| | EVA2 | 13.12 |
| | PS1 | 23.33 |
| | EVA1 | 5.83 |
| | Tween ® 80 | 10.00 |
| | Mirenat ® D | 2.50 |
| | Glycerol monostearate | 0 |
| Control | PS2 | 46.97 |
| | EVA2 | 19.70 |
| | PS1 | 23.33 |
| | Tween ® 80 | 10.00 |
| | Minerat ® D | 0 |

6.1.—Release of the Active Substance

The test to determine the amount of LAE released by the film was carried out as explained in Example 3.1. In this case, 100 mg of film was introduced into 25 ml of water such that it resulted in 117 ppm of LAE and samples were taken on days 1, 2, 3, 6, 9, 15 and 20. The results are shown in Table 15.

In order to evaluate the role of MA in films subjected to a cleaning process (for example with ethanol to sterilize the surface of the sample), two more samples were prepared like the previous ones, but they were subjected to a chemical cleaning process with ethanol before introducing them into water, where they were kept one day before determining the amount of LAE released by HPLC. The values obtained for these washed samples appear in brackets in Table 15.

TABLE 15

Percentage of LAE released

| Days | With MA, % LAE released | Without MA, % LAE released |
|---|---|---|
| 1 | 43 (29) | 60 (29) |
| 2 | 80 | 76 |
| 3 | 80 | 79 |
| 6 | 83 | 90 |
| 9 | 79 | 79 |
| 15 | 80 | 84 |
| 20 | 80 | 80 |

As seen in Table 15, there are no significant differences in LAE release in the presence or absence of MA. However, after subjecting the samples to a chemical cleaning process with ethanol (see data in brackets in Table 15), it is observed that the absence of MA causes the loss of 31% of the active substance, while in the film with MA it only loses 14% of said substance (after cleaning 29% of LAE is released while without cleaning 60% was released in the absence of MA and 43% in the presence of MA). Thus, it is demonstrated that MA acts as a physical protective barrier against the elimination or loss of active substance.

Furthermore, Table 15 shows that the MA prevents the migration of the active substance from being too fast in the first days. This is a great advantage because the first days are the most critical for microbiological control, since on those days the active substance begins to act against bacteria during their latency period.

6.2.—Antimicrobial Activity

The test was carried out as in section 3.2, with 117 ppm of LAE and with *L. monocytogenes* at a concentration of $10^5$, except that the surfaces of the films were cleaned with ethanol.

Figure 5:
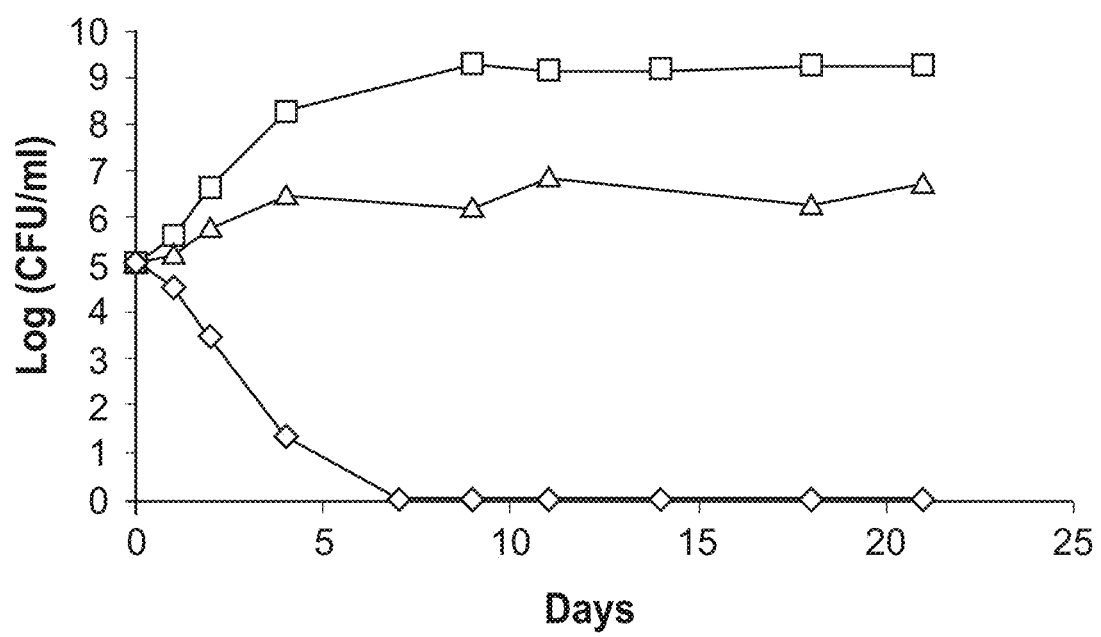
FIG. 5: Graphical representation of bacterial growth (in log CFU/ml) as a function of time (in days), where the red square is the control, the blue triangle is the film without MA and the green diamond is the film with MA. The initial concentration of Listeria was $10^5$.

As shown in FIG. 5, the film with MA (rhombus) has a bactericidal effect, while the film without MA (triangle) has a bacteriostatic effect compared to the control film (square) due to the elimination of part of the LAE during the chemical cleaning process of the surface.

Example 7: Film with Antifungal Activity

The in vitro antifungal activity of the developed films was studied against *Penicillium commune* using the agar diffusion method. It is a qualitative method that allows the antifungal activity of the films to be determined by the appearance of an halo of inhibition or absence of growth on the contact surface between the film and a Petri plate with agar inoculated with the target microorganism.

Briefly, in the agar diffusion method, a contrast medium is used on which a layer of soft culture medium inoculated with a cocktail of the target microorganism under study is deposited. Once the medium has solidified, a piece of film of dimensions 100 mm×100 mm is deposited and the plate is incubated (in the present case for 11 days at 23° C.). Positive antifungal activity results in a halo of inhibition or absence of mold growth on the surface or around the deposited film.

The following films were used in the present test, the composition of which appears in Table 16.

TABLE 16

| Film | Composition | |
|---|---|---|
| | Comp. | Cont. (% w/w$_t$) |
| Control | PS2 | 45.97 |
| | EVA2 | 19.70 |
| | PS1 | 23.33 |
| | Tween ® 80 | 10.00 |
| | Glyceride 8-10 C atoms | 0 |
| | Glycerol monostearate | 1.00 |
| Invention 1 | PS2 | 44.22 |
| | EVA2 | 13.12 |
| | PS1 | 23.33 |
| | EVA1 | 5.83 |
| | Tween ® 80 | 10.00 |
| | Glyceride 8-10 C atoms | 2.50 |
| | Glycerol monostearate | 1.00 |
| Invention 2 | PS2 | 44.22 |
| | EVA2 | 13.12 |
| | PS1 | 23.33 |
| | EVA1 | 5.83 |
| | Tween ® 80 | 10.00 |
| | Minerat D | 2.50 |
| | Glycerol monostearate | 1.00 |

Figure 6A:
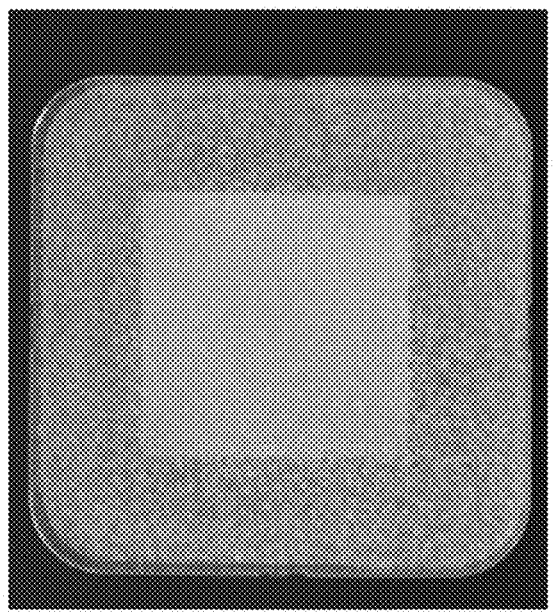
FIG. 6: Photographs of Petri plates with agar inoculated with the mold under analysis and with a control film (panel A) or with a film according to the invention (panels B and C).
Figure 6B:
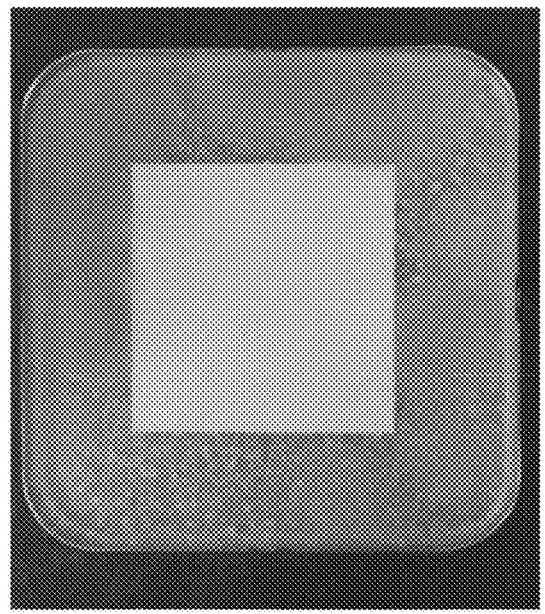
Figure 6C:
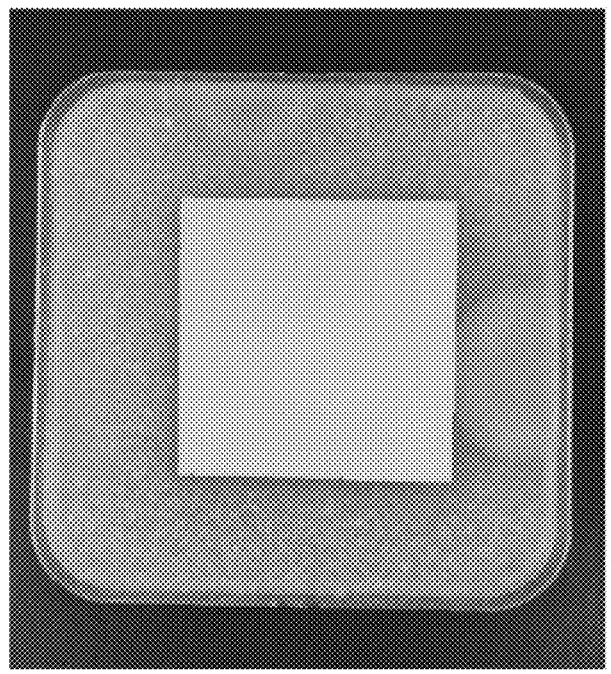

As shown in FIG. 6, in the control film (without fungicidal agent, panel A) the mold grows all over the plate, while in the films according to invention 1 (with Glyceride 8-10 atoms C, panel B) and invention 2 (with LAE, panel C) mold does not appear on the surface of the plate in contact with the film of the invention. Thus, it is demonstrated that the film of the invention has fungistatic or fungicidal activity, that is, it is capable of slowing down or inhibiting the growth of the mold under study. Note that there is a contaminating fungus (brownish) that does not grow on the surface of the plate in contact with the film of the invention either.

The invention claimed is:

1. A polystyrene film for applications in contact with food products, said film including at least one layer comprising:
   64%-70% (w/w$_t$) polystyrene crystal (PS) wherein the PS comprises PS with an MFI (Melt Flow Index) of between 10 g/10 min-40 g/10 min at 200°C. and 5 Kg (PS1) or PS with an MFI of 29/10 min-5 g/10 min at 200°C. and 5 Kg (PS2);
   16% -30% (w/w$_t$) ethylene copolymer with polar monomers (EMP) with a comonomer content of 15%-40% w/w$_{EMP}$;
   an active substance selected from the group consisting of an antioxidant agent and an antimicrobial agent;
   0.5%-2% (w/w$_t$) migration agent (MA); and,
   0-15% (w/w$_t$) emulsifying agent (EA) with an HLB greater than 8, being 3%-15% (w/w$_t$) when the active substance is an antimicrobial agent,
   wherein a PS/(EMP+EA) ratio is between 1.2 and 4.4, and
   wherein the foregoing percentages are given in percent by weight relative to a total weight of the layer (w/w$_t$) or relative to a total weight of the EMP (w/w$_{EMP}$).

2. The polystyrene film according to claim 1, wherein the EMP is selected from the group consisting of ethylene vinyl acetate copolymer (EVA), ethylene methyl acrylate copolymer (EMA), ethylene ethyl acrylate copolymer (EEA), ethylene butyl acrylate copolymer (EBA), and mixtures thereof.

3. The polystyrene film according to claim 1, wherein the PS is the only polystyrene of said at least one layer.

4. The polystyrene film according to claim 1, wherein the EMP comprises EMP with an MFI of between 15 g/10 min -50 g/10 min at 190° C. and 2.16 Kg (EMP1) or EMP with an MFI of 2 g/10 min -5 g/10 min at 190° C. and 2.16 Kg (EMP2).

5. The polystyrene film according to claim 1, wherein the content of the active substance in said at least one layer is 0.5%-6% (w/w$_t$).

6. The polystyrene film according to claim 1, wherein the emulsifying agent is selected from the group consisting of polyethylene glycol 400 dioleate, polyoxyethylene (20) sorbitan monolaurate, polyoxyethylene (20) sorbitan monopalmitate, polyoxyethylene (20) sorbitan monostearate, polyoxyethylene (20) sorbitan triestearate, polyoxyethylene (20) sorbitan monooleate, polyoxyethylene sorbitan monooleate, ethylene 40 polyoxide stearate, sorbitan monolaurate, and mixtures thereof.

7. The polystyrene film according to claim 1, wherein the active substance is an antioxidant agent and the content of the emulsifying agent is 0-5% (w/w$_t$).

8. The polystyrene film according to claim 1, wherein the active substance is an antioxidant agent selected from the group consisting of tocopherol, green tea extract, olive leaf extract, rosemary extract, grape seed extract, coffee extract, dehydrated acerola, citrus extract with a concentration of flavonoids greater than 45%, tomato extract with a concentration of lycopene greater than 5%, fruit extract, thymol, and mixtures thereof.

9. The polystrene film according to claim 1, wherein the active substance is an antimicrobial agent and the content of the emulsifying agent is 3%-12% (w/w$_t$); or,
wherein the active substance is an antimicrobial agent selected from the group consisting of anhydrous sodium acetate, nisin, lysozyme, Ag and its salts, Zn and its salts, ethyl N$^\alpha$-dodecanoyl-L-arginate (LAE) and salts thereof, LAE hydrochloride, glycolipid biosurfactants, and mixtures thereof.

10. The polystyrene film according to claim 1, wherein the migration agent is selected from the group consisting of fatty acid amides, fatty acid esters, metal stearates, waxes, and mixtures thereof.

11. The polystyrene film according to claim 10, wherein the migration agent is selected from the group consisting of erucamide, oleamide, glycerol monostearate (MG), zinc stearate, and waxes and mixtures thereof.

12. The polystyrene film according to claim 1, which is monolayer.

13. A multilayer film, wherein the multilayer film comprises the polystyrene film of claim 1 and further comprises at least one layer without active substance.

14. The multilayer film according to claim 13, wherein the at least one layer without active substance comprises crystal polystyrene and high impact polystyrene.

15. The multilayer film according to claim 14, wherein the at least one layer without active substance comprises 60%-90% (w/w$_t$) of crystal polystyrene and 10%-40% (w/w$_t$) of high impact polystyrene.

16. A multilayer film comprising three layers including two outer layers and an intermediate layer disposed between the outer layers wherein each of the two outer layers is the polystyrene film of claim 1, and wherein the intermediate layer is a layer without active substance.

17. The multilayer film according to claim 16, wherein the intermediate layer without active substance comprises crystal polystyrene and high impact polystyrene.

18. The multilayer film according to claim 17, wherein the intermediate layer without active substance comprises 60%-90% (w/w$_t$) of crystal polystyrene and 10%-40% (w/w$_t$) of high impact polystyrene.

19. Food wrap, packaging, or slice separating film manufactured from or comprising the polystyrene film according to claim 1.

20. A method for producing a film according to claim 1, the method comprising the following steps:
a) providing a polymer composition comprising:
64%-70% (w/w$_t$) PS,
16%-30% (w/w$_t$) EMP with a comonomer content of 15%-40% w/w$_{EMP}$,
an active substance selected from the group consisting of an antioxidant agent and an antimicrobial agent,
0.5%-2% (w/w$_t$) MA, and
0-15% (w/w$_t$) EA with an HLB greater than 8, being 3%-15% (w/w$_t$) when the active substance is an antimicrobial agent, wherein a PS/(EMP+EA) ratio is between 1.5 and 4.4; and
b) forming the polystyrene film with at least one layer comprising the polymer composition of a),
wherein the foregoing percentages are given in percent by weight relative to a total weight of the layer (w/w$_t$) or relative to a total weight of the EMP (w/w$_{EMP}$).

21. The method according to claim 20, comprising adding the emulsifying agent and the active substance to the polymer composition of a) in the form of a concentrate or masterbatch.

22. The method according to claim 20, comprising forming the polystyrene film by co-extrusion, extrusion-blowing, extrusion of double or triple bubble film, extrusion-flat film or cast, thermoforming, laminating, or blow-molding.

23. The polystyrene film according to claim 1, wherein the PS comprises PS with an melt flow index (MFI) of between 10 g/10 min-40 g/10 min at 200° C. and 5 Kg (PS1) and PS with an MFI of 2 g/10 min-5 g/10 min at 200° C. and 5 Kg (PS2).

24. The polystyrene film according to claim 1, wherein the EMP comprises EMP with an melt flow index (MFI) of between 15 g/10 min-50 g/10 min at 190° C. and 2.16 Kg (EMP1) and EMP with an MFI of 2 g/10 min-5 g/10 min at 190° C. and 2.16 Kg (EMP2).

25. The polystyrene film according to claim 1, wherein the PS comprises PS with an melt flow index (MFI) of between 10 g/10 min-40 g/10 min at 200° C. and 5 Kg (PS1) and/or PS with an MFI of 2.5 g/10 min-4 g/10 min at 200° C. and 5 Kg (PS2).

* * * * *

UNITED STATES PATENT AND TRADEMARK OFFICE
CERTIFICATE OF CORRECTION

PATENT NO. : 11,590,743 B2
APPLICATION NO. : 16/759395
DATED : February 28, 2023
INVENTOR(S) : Raúl Gallego Castro et al.

Page 1 of 1

It is certified that error appears in the above-identified patent and that said Letters Patent is hereby corrected as shown below:

In the Claims

Column 22, Line 41, Claim 1, "polystyrene crystal" should be -- crystal polystyrene --.

Column 22, Line 48, Claim 1, "w/w$_{EMP}$;" should be -- (w/w$_{EMP}$); --.

Column 22, Line 55, Claim 1, "1.2" should be -- 1.5 --.

Column 23, Line 12, Claim 6, "triestearate," should be -- tristearate, --.

Column 23, Line 27, Claim 9, "polystrene" should be -- polystyrene --.

Column 24, Line 15, Claim 20, "producing a film" should be -- producing the polystyrene film --.

Column 24, Line 20, Claim 20, "w/w$_{EMP}$," should be -- (w/w$_{EMP}$), --.

Signed and Sealed this
Fifth Day of November, 2024

Katherine Kelly Vidal
*Director of the United States Patent and Trademark Office*